(12) United States Patent
Champion et al.

(10) Patent No.: US 7,362,549 B2
(45) Date of Patent: Apr. 22, 2008

(54) STORAGE DEVICE HAVING FIRST AND SECOND MAGNETIC ELEMENTS THAT INTERACT MAGNETICALLY TO INDICATE A STORAGE STATE

(75) Inventors: Corbin L. Champion, Pullman, WA (US); Sarah M. Brandenberger, Boise, ID (US)

(73) Assignee: Seagate Technology LLC, Scotts Valley, CA (US)

( * ) Notice: Subject to any disclaimer, the term of this patent is extended or adjusted under 35 U.S.C. 154(b) by 455 days.

(21) Appl. No.: 10/848,841

(22) Filed: May 19, 2004

(65) Prior Publication Data

US 2005/0259366 A1 Nov. 24, 2005

(51) Int. Cl.
*G11B 5/39* (2006.01)
(52) U.S. Cl. .................... 360/324.2; 977/874
(58) Field of Classification Search ............... 369/126; 257/226; 977/874; 360/324.2
See application file for complete search history.

(56) References Cited

U.S. PATENT DOCUMENTS

| | | | |
|---|---|---|---|
| 5,036,490 A * | 7/1991 | Kajimura et al. ........... 369/126 |
| 5,345,815 A | 9/1994 | Albrecht et al. |
| 5,490,132 A * | 2/1996 | Yagi et al. ................. 369/126 |
| 5,535,185 A * | 7/1996 | Kishi et al. ................. 369/126 |
| 5,835,477 A | 11/1998 | Binnig et al. |
| 5,856,967 A | 1/1999 | Mamin et al. |
| 6,084,849 A * | 7/2000 | Durig et al. ................. 369/126 |
| 6,185,143 B1 | 2/2001 | Perner et al. |
| 6,233,206 B1 | 5/2001 | Hamann et al. |
| 6,370,107 B1 | 4/2002 | Hosaka et al. |
| 6,473,361 B1 | 10/2002 | Chen et al. |
| 6,665,258 B1 * | 12/2003 | Dietzel et al. ............... 369/126 |
| 6,817,231 B2 * | 11/2004 | Yasutake et al. .............. 73/105 |
| 6,865,108 B2 * | 3/2005 | Smith et al. ................. 365/171 |
| 6,999,403 B2 * | 2/2006 | Champion et al. .......... 369/126 |
| 7,167,435 B2 * | 1/2007 | Champion et al. .......... 369/126 |
| 2001/0013994 A1 * | 8/2001 | Tokisue et al. .......... 360/236.3 |
| 2002/0047145 A1 | 4/2002 | Nickel |
| 2003/0104249 A1 * | 6/2003 | Okuno et al. ............... 428/693 |
| 2003/0161179 A1 | 8/2003 | Bloomquist et al. |
| 2003/0172726 A1 * | 9/2003 | Yasutake et al. .............. 73/105 |
| 2003/0188240 A1 | 10/2003 | Perner |
| 2003/0206432 A1 | 11/2003 | Munden et al. |
| 2004/0042351 A1 * | 3/2004 | Onoe et al. ............... 369/13.01 |
| 2004/0047245 A1 * | 3/2004 | Onoe et al. ............... 369/13.01 |
| 2004/0228024 A1 * | 11/2004 | Ogawa et al. ................. 360/69 |
| 2005/0003561 A1 * | 1/2005 | Drewes ........................ 438/3 |
| 2005/0128886 A1 * | 6/2005 | Ogawa et al. ........... 369/13.33 |
| 2005/0161752 A1 * | 7/2005 | Seigler ........................ 257/425 |

OTHER PUBLICATIONS

Vettiger and Binnig, Scientific American, "The Nanodrive Project," pp. 47-51, 53 (Jan. 2003).

* cited by examiner

*Primary Examiner*—Brian E. Miller
(74) *Attorney, Agent, or Firm*—Benjamin T. Queen, II; Pietragallo Gordon Alfano Bosick & Raspanti, LLP

(57) ABSTRACT

A storage device includes a storage medium and a probe having a tip and a first magnetic element. The tip of the probe is adapted to form a dent in the storage medium. The storage device further has a second magnetic element, where the first and second magnetic elements are adapted to interact magnetically to indicate a storage state.

21 Claims, 3 Drawing Sheets

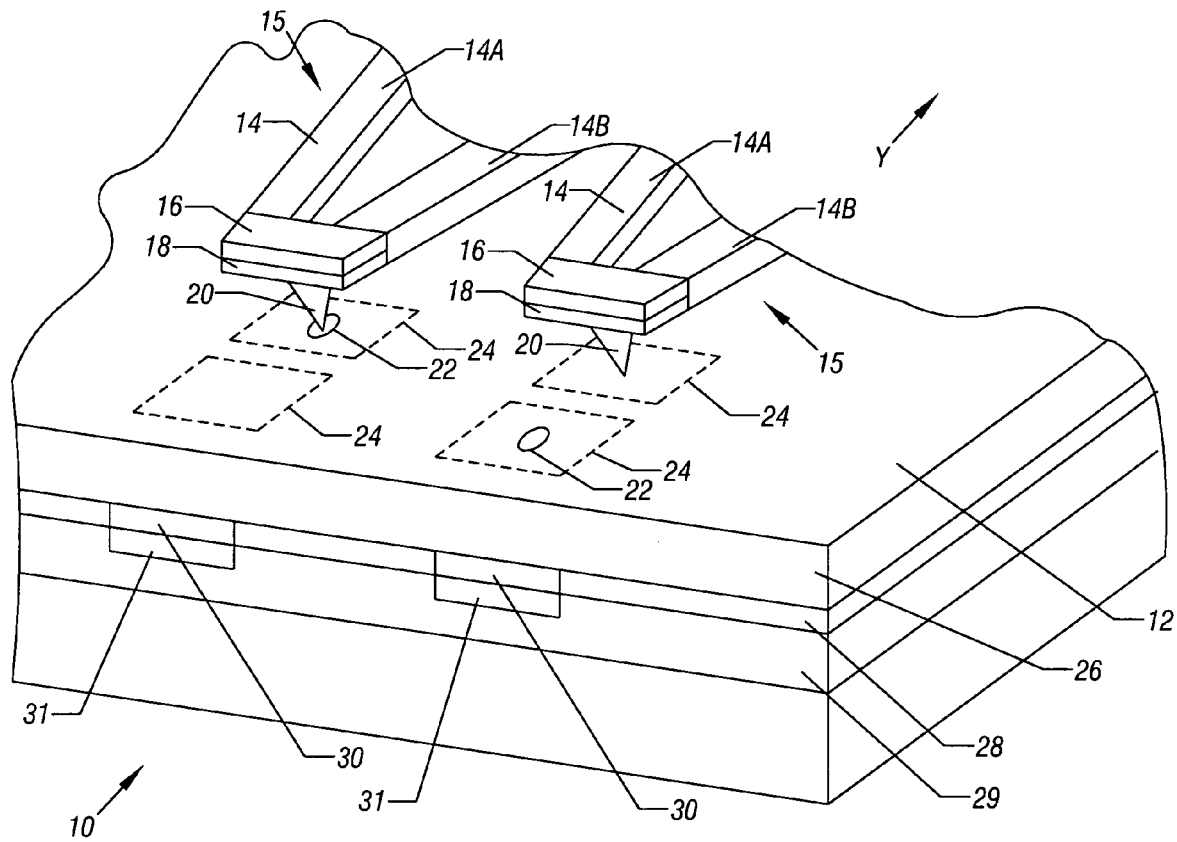
FIG. 1
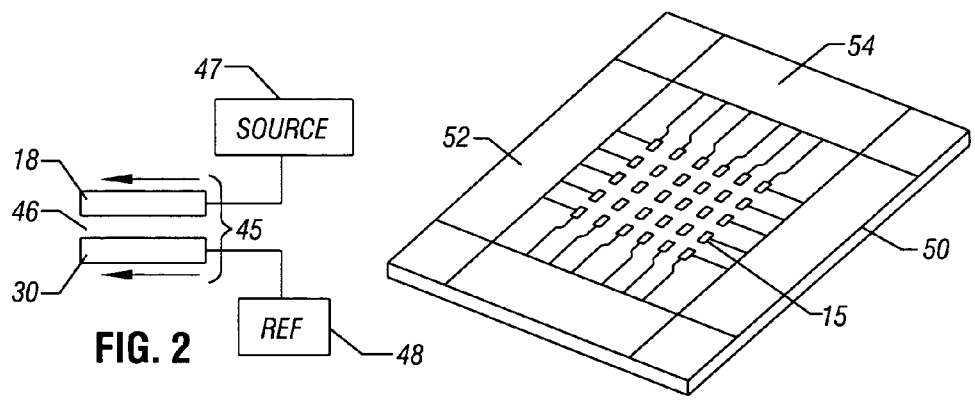
FIG. 2
FIG. 5

STORAGE DEVICE HAVING FIRST AND SECOND MAGNETIC ELEMENTS THAT INTERACT MAGNETICALLY TO INDICATE A STORAGE STATE

BACKGROUND

In computing systems, such as desktop computers, portable computers, personal digital assistants (PDAs), servers, and others, storage devices are used to store data and program instructions. One type of storage device is a disk-based device, such as a magnetic disk drive (e.g., a floppy disk drive or hard disk drive) and an optical disk drive (e.g., a CD or DVD drive). Disk-based storage devices have a rotating storage medium with a relatively large storage capacity. However, disk-based storage devices offer relatively slow read-write speeds when compared to operating speeds of other components of a computing system, such as microprocessors and other semiconductor devices.

Another type of storage device is a solid state memory device, such as a dynamic random access memory (DRAM), static random access memory (SRAM), flash memory, and electrically erasable and programmable read-only memory (EEPROM). Although solid state memory devices offer relatively high read-write speeds, usually on the order of nanoseconds, they have relatively limited storage capacities.

With improvements in nanotechnology (technology involving microscopic moving parts), other types of storage devices are being developed. One such storage device is based on atomic force microscopy (AFM), in which one or more microscopic scanning probes are used to read and write to a storage medium. Typically, a scanning probe has a tip that is contacted to a surface of the storage medium. Storage of data in the storage medium is based on perturbations created by the tip of the probe in the surface of the storage medium. In one implementation, a perturbation is a dent in the storage medium surface, with a dent representing a logical "1," and the lack of a dent representing a logical "0." Other types of perturbations that can be created in the surface of the storage medium include creating or altering the topographic features or composition of the storage medium, altering the crystalline phase of the medium, filling or emptying existing electronic states of the medium, creating or altering domain structures or polarization states in the medium, creating or altering chemical bonds in the medium, employing the tunneling effects to move and remove atoms or charge to or from the medium, or storing/removing charge from a particular region.

Traditionally, for a probe to read data bits from a storage medium in which dents have been formed, the probe is heated to a predetermined temperature, such as 400° C. When a scanning tip of the probe encounters and enters a dent, the tip transfers heat to the storage medium, which causes the temperature of the probe tip to fall, which in turn causes electrical resistance of the tip to fall. The fall in resistance, which is a relatively tiny amount, is detected by detection circuitry to determine the state of the data bit. Another technique for detecting the state of a data bit involves the use of a piezoresistive element in the probe. When the probe tip encounters a dent, the cantilever of the probe deflects, which causes the resistance of the piezoresistive element to change. The change in resistance is measured by detection circuitry. However, with the above techniques, the variation in resistance due to the presence and absence of a dent is relatively small. As a result, reliable detection of data bits may not always be possible due to the presence of noise and other factors. Also, the speed at which read operations can be performed is also reduced due to weak read signals in such probe-based storage devices.

BRIEF DESCRIPTION OF THE DRAWINGS

FIG. 1 illustrates a portion of a probe-based storage device in which detection of data states is based on magnetic interaction between a first magnetic element on a probe and a second magnetic element that is spaced apart from the first magnetic element, in accordance with some embodiments of the invention.

FIG. 2 illustrates a parallel magnetization orientation in a tunneling junction including the first and second magnetic elements of FIG. 1 and a dielectric layer separating the first and second magnetic elements.

FIG. 5 is a schematic diagram of a probe substrate containing an array of probes and peripheral circuitry to interact with such probes.

DETAILED DESCRIPTION

Figure 3:
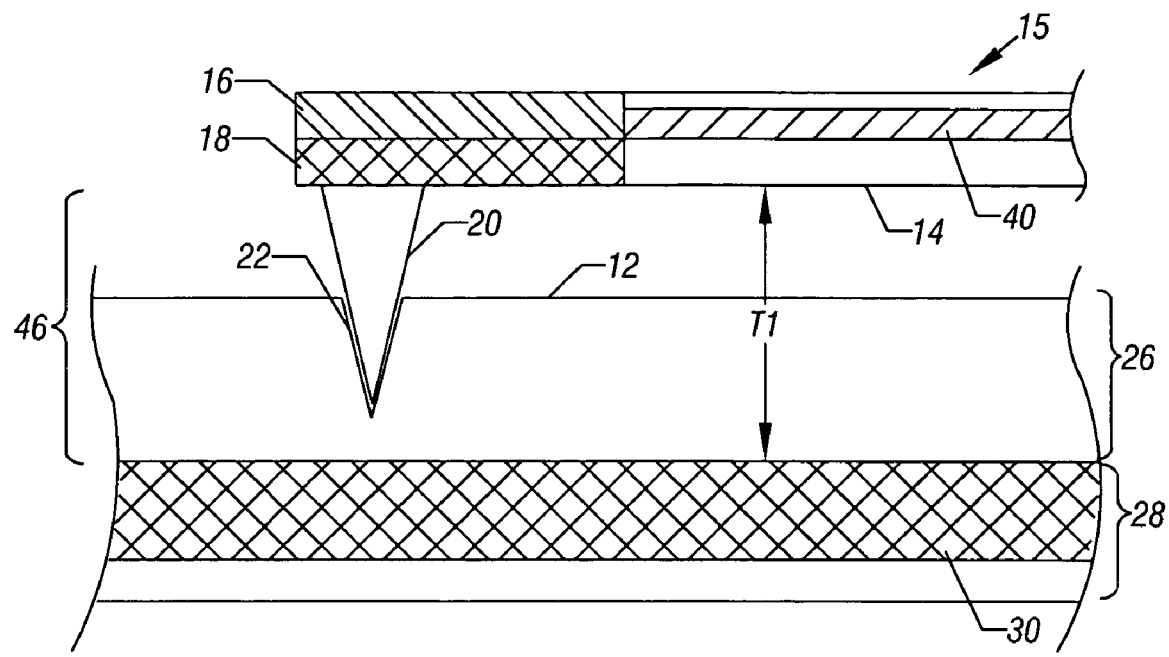
FIG. 3 is a cross-sectional view of the probe and storage medium of FIG. 1, where the tip of the probe is engaged in a dent formed in the storage medium.

FIG. 1 shows an example probe-based storage device that includes a storage substrate 10 that provides a storage medium. As used here, the term "storage medium" refers to any medium in which storage cells are capable of being formed. The storage medium can make up a portion of the storage substrate 10, or the storage medium can be considered to be the whole storage substrate 10. As illustrated in FIG. 1, the storage medium is at least made up of a storage layer 26 that defines a storage surface 12.

Perturbations can be formed in the storage layer 26 by tips 20 of respective probes 15. In some embodiments, the perturbations include dents 22, which are basically pits or holes that are formed into the storage layer 26. In one example implementation, the storage layer 26 is formed of a soft material such as polymer (e.g., PMMA or polymethylmethacrylate).

In the example shown in FIG. 1, the tip 20 of each probe 15 is attached to and extends outwardly from a cantilever 14 of the probe 15. According to some embodiments, the probe 15 is a very small probe (on the order of micrometers, nanometers, or even smaller) that is built using nanotechnology techniques. Such a probe is referred to as a microscopic or nanotechnology probe.

In the implementation depicted in FIG. 1, the cantilever 14 has two sections 14A and 14B that join at an end portion. The tip 20 protrudes from the end portion of the cantilever 14. In alternative embodiments, instead of having plural sections 14A, 14B, the cantilever 14 can be a single-piece cantilever.

In accordance with some embodiments of the invention, a magnetic element 18 is also provided at the end portion of the cantilever 14 of each probe 15. In other embodiments, the magnetic element 18 can be provided at a different location on the probe 15 along the length of the probe 15. The magnetic element 18 interacts with a corresponding magnetic element 30 formed in a layer 28 of the storage substrate 10 to provide a variable resistance (exhibited by tunneling magnetoresistance or TMR) that is dependent upon whether or not the probe 15 is engaged in a dent 22. Each of the magnetic layers 18 and 30 can be formed of one of the following materials: nickel iron (NiFe), iron oxide ($Fe_3O_4$), chromium oxide ($CrO_2$), a cobalt alloy (e.g., CoFe), or any other ferromagnetic material, ferrimagnetic material, or magnetic material.

As depicted in FIG. 1, multiple magnetic elements 30 in the layer 28 are provided to interact with corresponding magnetic elements 18 of respective probes 15. In one implementation, each magnetic element 30 is an elongated strip that extends along a direction indicated by the arrow Y. The magnetic element 30 that is made up of the elongated strip extends along a column of multiple storage cells 24 in which dents 22 are selectively formed. Alternatively, instead of a magnetic element 30 that is an elongated strip, discrete magnetic elements are provided in the layer 28, one for each storage cell 24. Note that the storage substrate 10 is moveable with respect to the probes 15 such that the probes 15 can be moved over different storage cells 24. In this respect, the magnetic element 18 of each probe 15 is able to interact with different magnetic elements 30 in the layer 28.

Each magnetic element 18 is separated from a respective magnetic element 30 by a dielectric layer, which includes the storage layer 26 as well as a gas (such as air) between the storage surface 12 provided by the storage layer 26 and the probe 15. Each of the magnetic elements 18 and 30 has a fixed orientation of magnetization. The dielectric layer between the magnetic elements 18 and 30 provides an insulating tunnel barrier sandwiched between the magnetic layers.

As further depicted in FIG. 2, the magnetic elements 18 and 30 have a parallel magnetization orientation, in which the orientations of magnetization of the magnetic elements 18 and 30 point in the same direction (indicated by the parallel arrows depicted in FIG. 2). Alternatively, the magnetic elements 18 and 30 can have an anti-parallel magnetization orientation (in which the orientation of magnetization of the magnetic element 18 points in a direction opposite to the orientation of magnetization of the magnetic element 30).

A tunneling junction 45 (FIG. 2) including the magnetic elements 18 and 30 and the dielectric layer (represented by reference numeral 46) between the magnetic elements 18 and 30 exhibits tunneling magnetoresistance (TMR) in the presence of the magnetic field provided by the magnetic elements 18 and 30. The TMR changes depending upon whether or not the probe tip 20 is engaged in a dent 22.

During a read operation, a voltage is applied by a voltage source 47 (FIG. 2) to an electrically conductive plate 16 (FIG. 1) at the end portion of the probe 15 in the proximity of the magnetic element 18. Similarly, a reference potential is provided by a reference source 48 (FIG. 2) to an electrically conductive plate 31 (FIG. 1) in a layer 29. The electrically conductive plate 31 is placed in the proximity of a corresponding magnetic element 30. The voltage difference between the voltage applied at the plate 16 and the voltage applied at the plate 31 causes current to flow through the resistance provided by the tunneling junction 45 (FIG. 2). As depicted in FIG. 1, multiple electrically conductive plates 31 in the layer 29 are provided in the proximity of multiple corresponding magnetic elements 30.

FIG. 1 shows an array of storage cells 24. Note that a large number of storage cells 24 are provided in the storage medium with four such storage cells 24 shown in FIG. 1 for purposes of illustration. In each storage cell 24, the tip 20 can selectively cause formation of a dent 22. In the example shown in FIG. 1, two of the storage cells 24 contain dents 22 formed by the tip 20 of the probe 15, while two of the storage cells 24 do not have the dents 22. Absence of a dent 22 represents a first logical state, while presence of the dent 22 represents a second storage state. Thus, for example, the presence of the dent 22 represents a logical "1," while the absence of the dent represents a logical "0."

When a tip 20 of a probe 15 engages a dent 22, the magnetic element 18 on the probe 15 is brought into closer proximity to the magnetic element 30 in the layer 28. As a result, the tunneling magnetoresistance provided by the tunneling junction 45 (FIG. 2) is reduced, as increased tunneling of electrons occur due to the reduced thickness of the dielectric layer 46 between the magnetic elements 18 and 30. On the other hand, if the tip 20 is engaged on the storage surface 12 but not in a dent 22, then the dielectric layer 46 between the magnetic elements 18 and 30 has an increased thickness, which causes the tunneling magnetoresistance to increase due to a decrease in tunneling of electrons through the dielectric layer 46 between the magnetic elements 18 and 30. To detect the storage state of each storage cell 24, current flow through the corresponding tunneling junction 45 is measured by a respective sensing device.

In an alternative embodiment, in response to the probe tip 20 being engaged on the storage surface 12 but not in a dent 22, the distance between the magnetic elements 18 and 30 may be large enough such that no current flow occurs through the tunneling junction 45 (FIG. 2). In other words, the tunneling magnetoresistance of the tunneling junction 45 is infinite. In this alternative embodiment, the variable resistance varies between an infinite value (in response to the probe tip 20 not being in a dent) and a finite value (in response to the probe tip 20 being in a dent).

Effectively, the magnetic element 18 on a probe 15 interacts magnetically with the magnetic element 30 in the layer 28 of the storage substrate 10 to provide a variable magnetoresistance based on the variable spacing between the magnetic elements 18 and 30.

To create a dent 22 during a write operation, the tip 20 is locally heated to a predetermined temperature (e.g., up to about 400° C. or even greater) for some amount of time. The heat from the tip 20 melts the storage surface 12 at the contact point of the tip 20. When a downward force is applied onto the probe 15, the tip 20 imprints the dent 22. The applied downward force can be an incremental, applied downward force, or alternatively, a constant downward force due to the elastic nature of the cantilever 14. For example, the storage device can be assembled such that the cantilever 14 is bent back a little and thus applies constant force on the storage surface 12.

Once a dent is formed, the dent can be erased by also using the tip 20. During erase, the tip 20 engages the dent 22, with the tip 20 being heated locally to melt the material surrounding the dent 22 such that the material flows into the dent 22 to remove the dent. Alternatively, instead of using the tip 20 to erase a dent, a local heat source can be provided underneath the storage medium in the storage substrate 10, with the heat source heated to melt the material surrounding the dent to reflow material back into the dent. Examples of such local heat sources include resistors or other heating elements.

FIG. 3 is a cross-sectional view of a probe 15 engaged in a dent 22 formed into the storage layer 26. As a result of the tip 20 being engaged in the dent 22, the magnetic element 18 is brought into closer proximity to the magnetic element 30 formed in the layer 28. In this case, the dielectric layer 46 has a first thickness T1. During a read operation, an electrical voltage is applied through an electrical conductor 40 in the cantilever 14 to the electrically conductive plate 16. Based on the tunneling magnetoresistance of the tunneling junction 45 (FIG. 2) including the magnetic elements 18, 30, and dielectric layer 46, a current is induced through the electrical conductor 40, electrically conductive plate 16, magnetic element 18, tip 20, layer 26, and the magnetic element 30. An electrically conductive plate 31 (FIG. 1) in the proximity of the magnetic element 30 carries the current to a reference source 48 (FIG. 2). This current flow is measured by a sensing device. Collectively, the electrical conductor 40 in the probe 15, the electrically conductive plate 16, the tunneling junction 45 (made up of the magnetic elements 18, 30 and the dielectric layer 46), and the electrically conductive plate 31 make up a current flow path.

Figure 4:
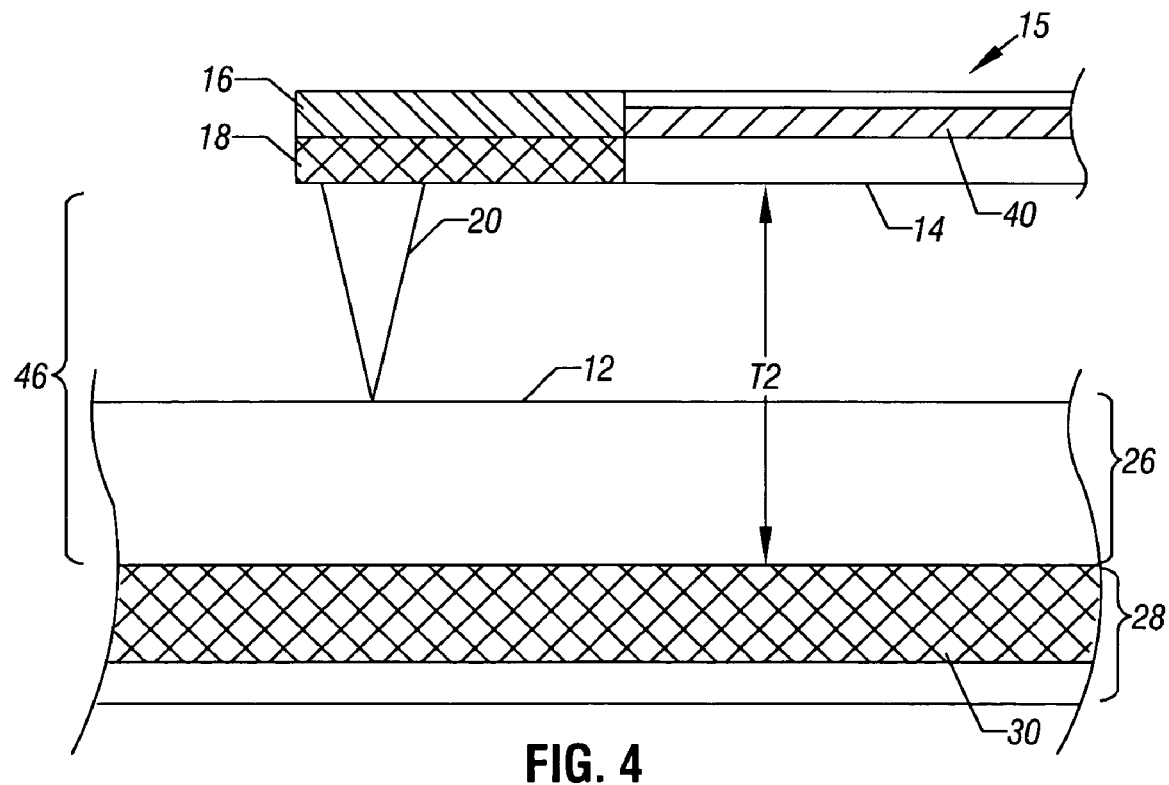
FIG. 4 is a cross-sectional view of the probe and storage medium of FIG. 1, where the tip of the probe is engaged on a surface of the storage medium but not in a dent.

FIG. 4 is a cross-sectional view of a probe 15 that is engaged on the storage surface 12 but that is not engaged in a dent. As a result, the dielectric layer 46 has a second thickness T2, where T2 is greater than T1. In this case, the tunneling magnetoresistance between dielectric elements 18 and 30 through the dielectric layer 46 is increased. Based on the same voltage being applied to the electrically conductive plate 16, a lower (or no) current flow is induced through the electrical conductor 40 and the remainder of the current flow path.

The different current flow through the current flow path is detected by a sensing device and converted to a storage state of a corresponding storage cell 24.

In an alternative embodiment, to achieve closer proximity of the magnetic elements in the probe and substrate, the layer 26 of FIG. 3 can also be formed of a magnetic material. In this embodiment, the layers 26 and 28 of FIG. 3 are combined into one magnetic element, such that the storage surface 12 is defined by a surface of the magnetic element in the substrate. As a result, the probe tip 20 forms dents 22 in the magnetic element (rather than in the insulating storage layer 26 of FIG. 3). In this embodiment, the dielectric layer 46 between the magnetic elements is made much thinner. Effectively, the dielectric layer 46 is made up of the space between the probe 15 and the storage surface 12. In some example implementations, the distance between the magnetic element 18 in the probe 15 and the magnetic element in the substrate is reduced to less than 50 angstroms when the probe tip 20 is engaged in a dent 22. The reduced distance between magnetic elements enhances tunneling to occur.

In a variant of the alternative embodiment, if it is not desired to form dents directly in a magnetic element, an array of spots, formed of an insulating material such as PMMA, can be defined in the magnetic element in the substrate. The probe tip 20 forms dents in these spots. This variant enables formation of dents in an insulating material while still providing reduced distance between magnetic elements.

FIG. 5 illustrates a probe substrate 50 that includes an array of probes 15 formed in the probe substrate 50. Peripheral circuitry 52 and 54 are provided on the peripheral sides of the probe substrate 50. For example, peripheral circuitry 52 and 54 can drive X and Y select lines to select bits of the storage array to read from or write to. A row of probes 15 may be activated by the select lines to read from or write to storage cells that the probes are in contact with. This structure enables concurrent access of multiple cells in one operation, which improves access speeds. Alternatively, one of the probes may be activated to read from or write to a storage cell. The peripheral circuitry 52 and 54 also include voltage sources (such as voltage source 47 in FIG. 2) and sensing devices to measure current flow through the probes 15 during a read operation. The sensing devices convert the measured current flow to a digital representation of a logical "0" or a logical "1." Also, during a write operation, the peripheral circuitry causes heating of selected probe(s) 15 to imprint dents in selected storage cells.

Figure 6:
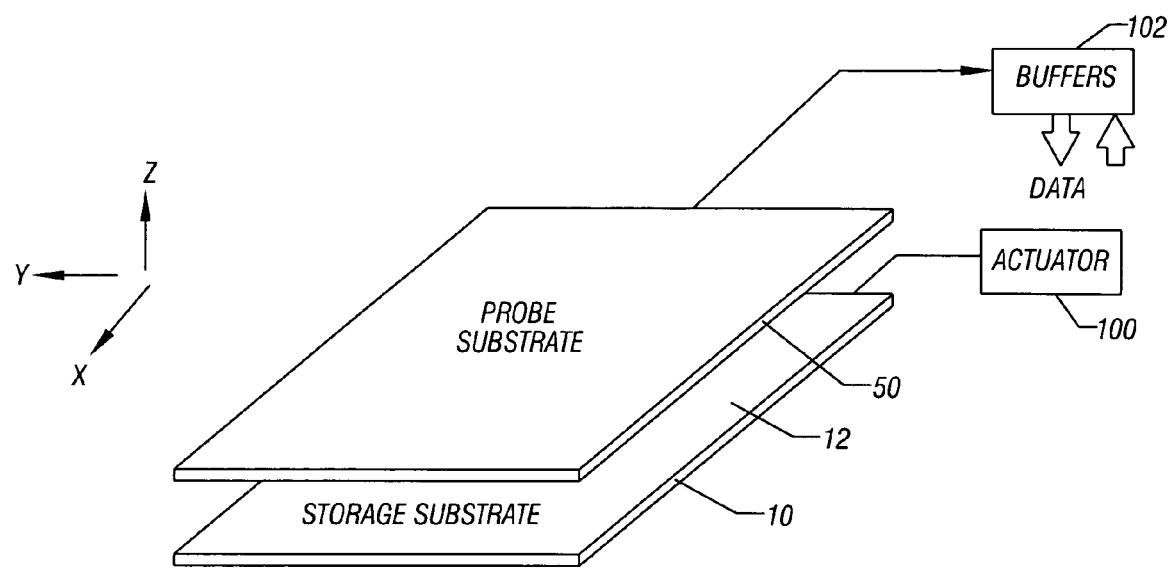
FIG. 6 illustrates the probe substrate positioned to face the storage substrate in the probe-based storage device of FIG. 1.

As shown in FIGS. 1 and 6, the probe substrate 50 is placed with the surface containing the probes 15 facing the storage surface 12 of the storage substrate 10, on which the storage cells are formed. The probe substrate 50 is positioned over the storage substrate 10 so that the probe tips 20 (FIG. 1) point downwardly to engage the storage surface 12 of the storage substrate 10. In an alternative arrangement, the storage substrate 10 is positioned over the probe substrate 50 so that the probe tips 20 point upwardly to face the storage surface 12. In other arrangements, the probe substrate 50 and the storage substrate 10 can have a lateral or diagonal relationship.

The storage substrate 10, in the example of FIG. 6, is coupled to an actuator 100 that is designed to move the storage substrate 10 in both X and Y directions such that probes 15 (FIG. 1) can be placed over desired storage cells on the storage medium. Data sensed by the probes 15 is provided to buffers 102, which store output data for retrieval by an external device. The buffers 102 may also store write data to be written to storage cells 24 (FIG. 1) in the storage substrate 10.

Alternatively, the actuator 100 is operatively coupled to move the probe substrate 50, or to move both the probe substrate 50 and the storage substrate 10. The actuator 100 is also able to move the probe substrate 50 and/or the storage substrate 10 in the Z direction, which is generally perpendicular to the X and Y directions.

Figure 7:
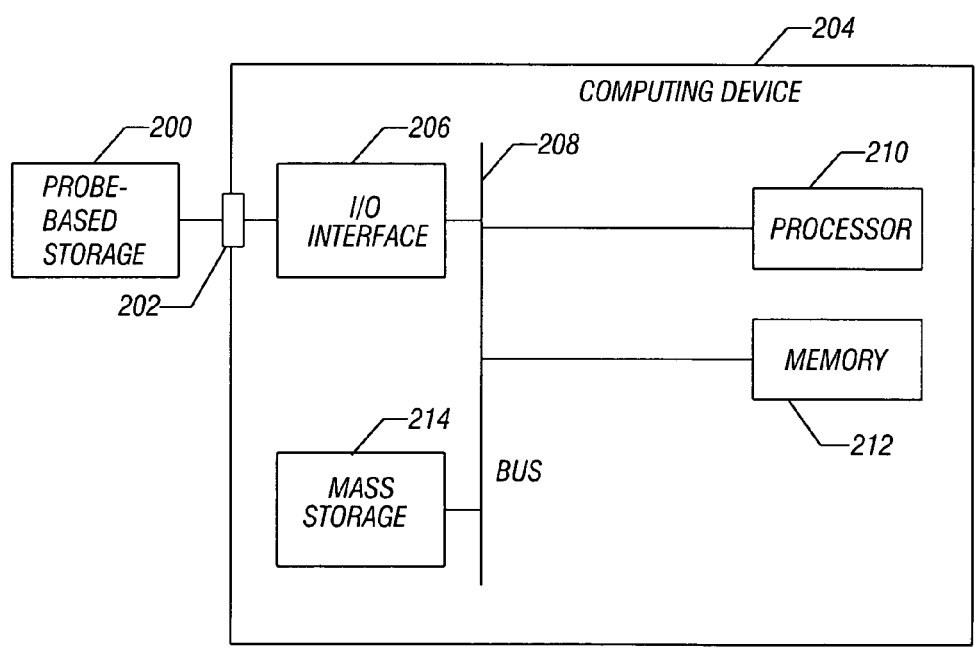
FIG. 7 is a block diagram of a system that includes a computing device having

The probe-based storage device can be packaged for use in a computing system. For example, as shown in FIG. 7, a probe-based storage device 200 that incorporates an embodiment of the invention is attached or connected to an I/O (input/output) port 202 of a computing device 204. The I/O port 202 can be a USB port, a parallel port, or any other type of I/O port. Inside the computing device 204, the I/O port 202 is connected to an I/O interface 206, which in turn is coupled to a bus 208. The bus 208 is coupled to a processor 210 and memory 212, as well as to mass storage 214. Other components may be included in the computing device 204. The arrangement of the computing device 204 is provided as an example, and is not intended to limit the scope of the invention. In alternative embodiments, instead of being coupled to an I/O port of the computing system, the probe-based storage device can be mounted (directly or through a socket) onto the main circuit board of the computing system.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage device comprising:
   a probe having a tip and a first magnetic element;
   a storage medium, wherein the tip of the probe is adapted to form a dent in the storage medium;

a second magnetic element, wherein the first and second magnetic elements are separated by a first distance in response to the tip being engaged in the dent, and wherein the first and second magnetic elements are separated by a second distance in response to the tip being engaged on a surface of the storage medium but not in the dent; and a dielectric layer between the first magnetic element and the second magnetic element, wherein the first magnetic element, second magnetic element, and the dielectric layer form a tunneling junction that exhibits tunneling magnetoresistance, wherein the first and second magnetic elements are adapted to interact magnetically to indicate a storage state.

2. The storage device of claim 1, wherein the tunneling junction exhibits a first magnetoresistance in response to the first and second magnetic elements being separated by the first distance, and the tunneling junction exhibits a second, larger magnetoresistance in response to the first and second magnetic elements being separated by the second distance.

3. The storage device of claim 1, wherein each of the first and second magnetic elements is formed of at least one of a ferromagnetic material and a ferrimagnetic material.

4. The storage device of claim 1, wherein the tip of the probe is adapted to form the dent during a write operation, the storage device further comprising:

a sensing device to sense the magnetic interaction of the first and second magnetic elements during a read operation.

5. The storage device of claim 4, wherein the tip of the probe is adapted to be raised to an elevated temperature to form the dent.

6. The storage device of claim 1, further comprising a substrate including the storage medium and the second magnetic element, the storage medium between the probe and the second magnetic element.

7. The storage device of claim 1, further comprising:

a second probe having a tip and a third magnetic element; and a fourth magnetic element, wherein the tip of the second probe is adapted to form a dent in the storage medium, wherein the third and fourth magnetic elements are adapted to interact magnetically to indicate a storage state.

8. The storage device of claim 7, wherein the first and second magnetic elements exhibit different magnetoresistances depending upon whether the first probe is engaged in a dent, and the third and fourth magnetic elements exhibit different magnetoresistances depending upon whether the tip of the second probe is engaged in a dent.

9. A system comprising:

a processor; and a storage device coupled to the processor, the storage device comprising:

a probe having a tip and a first magnetic element;

a storage medium, wherein the tip of the probe is adapted to form a dent in the storage medium; and a second magnetic element, wherein the first and second magnetic elements interact to exhibit a first magnetoresistance in response to the tip of the probe being engaged in the dent, and wherein the first and second magnetic elements interact to provide a second, different magnetoresistance in response to the tip of the probe not being engaged in the dent.

10. The system of claim 9, wherein the storage medium is provided between the probe and the second magnetic element.

11. The system of claim 9, wherein the storage device further comprises a sensing device to sense the magnetoresistance provided by interaction of the first and second magnetic elements.

12. The system of claim 11, wherein the storage device further comprises:

an electrically conductive plate in the proximity of the first magnetic element; and a voltage source to apply a voltage to the electrically conductive plate, wherein a current is adapted to be induced through the magnetoresistance provided by interaction of the first and second magnetic elements in response to the applied voltage.

13. The system of claim 9, wherein the probe comprises a nanotechnology probe.

14. The system of claim 9, wherein the storage medium comprises plural storage cells, the probe to selectively form dents in one or more of the plural storage cells, wherein the storage device further comprises a third magnetic element, the second magnetic element associated with a first storage cell, and the third magnetic element associated with a second storage cell, the storage medium moveable with respect to the probe to enable the first magnetic element to interact with the second magnetic element to provide one variable magnetoresistance, and to enable the first magnetic element to interact with the third magnetic element to provide another variable magnetoresistance.

15. The system of claim 14, wherein the storage device further comprises a storage substrate including the storage medium, the storage substrate further comprising a layer containing the second and third magnetic elements.

16. The system of claim 15, wherein the probe has a first electrically conductive plate to receive a first voltage, and the storage substrate includes another layer containing electrically conductive plates to receive a reference voltage, the first voltage and the reference voltage to induce current flow through one of the variable magnetoresistances.

17. A storage device comprising:

a probe having a tip and a first magnetic element;

a storage medium;

a second magnetic element, wherein the first and second magnetic elements are separated by a first distance in response to the tip being engaged in a dent in the storage medium, and wherein the first and second magnetic elements are separated by a second distance in response to the tip being engaged on a surface of the storage medium but not in the dent; and a dielectric layer between the first magnetic element and the second magnetic element, wherein said first magnetic element, said second magnetic element, and said dielectric layer form a tunneling junction that exhibits a first magnetoresistance in response to the first and second magnetic elements being separated by the first distance, and the tunneling junction exhibits a second, larger magnetoresistance in response to the first and second magnetic elements being separated by the second distance, wherein the first and second magnetic elements interact magnetically to indicate a storage state.

18. The storage device of claim 17, wherein each of the first and second magnetic elements is formed of at least one of a ferromagnetic material and a ferrimagnetic material.

19. The storage device of claim 17, further comprising a sensing device to sense the magnetic interaction of the first and second magnetic elements during a read operation.

20. The storage device of claim 19, wherein the tip of the probe is adapted to be raised to an elevated temperature to form a dent in the storage medium.

21. The storage device of claim 17, further comprising:
a second probe having a tip and a third magnetic element; and
a fourth magnetic element,
wherein the third and fourth magnetic elements interact magnetically to indicate a storage state.

* * * * *